(12) United States Patent
Kern et al.

(10) Patent No.: US 7,194,410 B1
(45) Date of Patent: Mar. 20, 2007

(54) GENERATION OF A REFERENCE-MODEL DIRECTORY FOR A VOICE-CONTROLLED COMMUNICATIONS DEVICE

(75) Inventors: Ralf Kern, Bocholt (DE); Karl-Heinz Pflaum, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,055

(22) PCT Filed: Apr. 3, 2000

(86) PCT No.: PCT/DE00/01019

§ 371 (c)(1),
(2), (4) Date: Oct. 17, 2001

(87) PCT Pub. No.: WO00/65807

PCT Pub. Date: Nov. 2, 2000

(30) Foreign Application Priority Data

Apr. 22, 1999 (DE) .............................. 199 18 382

(51) Int. Cl.
G10L 15/00 (2006.01)
G10L 15/06 (2006.01)
(52) U.S. Cl. ............... 704/270.1; 704/243; 704/255
(58) Field of Classification Search ............... 704/275
See application file for complete search history.

(56) References Cited

U.S. PATENT DOCUMENTS

| | | | | |
|---|---|---|---|---|
| 5,159,637 A | | 10/1992 | Okazaki et al. | |
| 6,078,886 A | * | 6/2000 | Dragosh et al. | ............ 704/270 |
| 6,195,641 B1 | * | 2/2001 | Loring et al. | ............... 704/275 |
| 6,311,157 B1 | * | 10/2001 | Strong | ........................ 704/255 |
| 6,359,971 B1 | * | 3/2002 | Haimi-Cohen et al. | .. 379/88.01 |
| 6,363,348 B1 | * | 3/2002 | Besling et al. | ........... 704/270.1 |
| 6,456,974 B1 | * | 9/2002 | Baker et al. | ............. 704/270.1 |
| 6,463,413 B1 | * | 10/2002 | Applebaum et al. | ........ 704/256 |
| 6,636,831 B1 | * | 10/2003 | Profit et al. | ................. 704/275 |
| 6,744,860 B1 | * | 6/2004 | Schrage | .................... 379/88.03 |

FOREIGN PATENT DOCUMENTS

| | | |
|---|---|---|
| DE | 35 19 915 | 12/1986 |
| EP | 0 676 882 | 10/1995 |
| WO | WO 94 26054 | 11/1994 |

OTHER PUBLICATIONS

McDermott et al., "A Telephone Based Directory Assistance System Adaptively Trained Using Minimum Classification Error/Generalized Probabilistic Descent", pp. 3346-3349.

* cited by examiner

*Primary Examiner*—David Hudspeth
*Assistant Examiner*—Matthew J. Sked
(74) *Attorney, Agent, or Firm*—Bell, Boyd & Lloyd LLP

(57) ABSTRACT

For a voice recognition system in a voice-controlled communication appliance, command words from a vocabulary are entered in text form and are transmitted to a separate converter station via a communication link initiated by the communication appliance, wherein the converter station performs word/model conversion on the command words and sends the reference models created in this way via a communication link to the terminal, in which they are stored and are made available to the voice recognition system.

12 Claims, 1 Drawing Sheet

GENERATION OF A REFERENCE-MODEL DIRECTORY FOR A VOICE-CONTROLLED COMMUNICATIONS DEVICE

BACKGROUND OF THE INVENTION

The present invention relates to a method for creating a reference model list for a voice recognition system in a voice-controlled communication appliance.

The present invention equally relates to an apparatus for creating reference models for voice recognition systems, having a conversion part for performing word/model conversion on command words in text form to produce reference models for use in voice recognition systems.

The present invention also relates to a voice-controlled communication appliance which has a voice recognition system having a memory for a reference model list.

In this case, a communication appliance is understood to be an appliance which is intended to be used for transmitting or processing speech and/or text, such as a terminal in a telecommunication network or a word processing system. In this regard, use needs to be distinguished from control of the communication appliance. A voice-controlled communication appliance is, therefore, a communication appliance which receives commands in spoken form, processes them and performs appropriate operations. The development of voice recognition systems for processing and recognizing spoken language and, as an application of voice recognition systems, of voice-controlled communication appliances is currently a significant area of technical development.

The known voice recognition systems, used in voice-controlled communication appliances, can be divided up into two groups; namely, speaker-independent systems having a prescribed, fixed vocabulary, in the first instance, and speaker-dependent, configurable systems in the second instance. A drawback of the former, speaker-independent systems is that they cannot be configured on an individual basis; once a particular word, e.g. in the form of a command for a particular control function of the communication appliance, has been defined, this word cannot be changed again later.

On the other hand, individually configurable systems of known type have the drawback that use by various users, i.e. voice recognition for a number of speakers, is not possible or is possible only with severe forfeiture in terms of the performance of the voice recognition. Another drawback of the configurable systems is that they need to be trained. Since the training involves recording and processing voice samples, of course, this often requires a great deal of effort and, furthermore, is time-consuming; particularly with regard to the requirements from the surroundings, for example, in terms of background noise.

A known approach to overcoming the speaker-dependency of configurable voice recognition systems uses "user recognition". With this solution, the user needs to identify oneself to the voice recognition system using a dedicated password, and only on the basis of this identification is the system able to recognize the words entered by this user. Another known option is for the individual words to be practiced by various users and for the voice recognition system to generate a shared model for the word spoken by the users. Neither solution can dispense with training, however, and they therefore suffer from the aforementioned drawbacks of training. In addition, the ability to use them remains limited to the users involved.

Other known communication appliances use a hybrid form of speaker-independent and speaker-dependent voice recognition.

In this case, a permanently prescribed basic vocabulary is used to provide a speaker-independent vocabulary, and speaker-dependent recognition can be used to configure an individual supplementary vocabulary. However, even with this solution, recognition of the supplementary vocabulary is speaker-dependent and training is necessary as before.

DE 35 19 915 A1 discloses a method for voice recognition on terminals in telecommunication systems, in which the terminal contains a speech buffer which additionally holds voice signals supplied to a voice recognition section and forward them to a central voice recognition device which is arranged in the telecommunication system and has an increased storage and computation capacity if a voice recognition device held in the terminal cannot recognize a voice input clearly and associate it with a prescribed reference pattern.

It is an object of the present invention, therefore, to illustrate a way of configuring speaker-independent voice recognition for a communication appliance on an individual basis.

SUMMARY OF THE INVENTION

The present invention achieves this object via a method of the type mentioned in the introduction having the following steps:

a) at least one command word is entered in text form on the communication appliance by a user, b) the command word(s) is/are transmitted to a converter station via a communication link initiated by the communication appliance, c) at least one reference model is created by the converter station using the command words, with a respective command word having a reference model allocated to it via word/model conversion, d) the reference model(s) is/are sent to the terminal via a communication link, and e) the reference model(s) received is/are stored in a reference model list by the communication appliance.

This solution allows individual and, at the same time, speaker-independent configuration of the vocabulary of a voice recognition system. In this context, the generally considerable computation power required for conversion does not need to be provided by the communication appliance. Among other things, this also permits national variants or regional forms from the speakers or users to be set. Another advantage is that progress or further development in the field of word/model conversion can easily, namely indirectly via the remote converter station, benefit the user of such a communication appliance.

In this context, it is advantageous if, in step a), the command words are collected in a command list by the communication appliance and, in step b), the command list is transmitted to the converter station on the basis of a specific command given to the communication appliance by the user. This permits "bundled" transmission of the command words and reduces the number of connections required and also the connection time overall, and the command words in the command list can be corrected as well, added to or the like at a later time.

For corresponding reasons, it is beneficial if the converter station compiles the reference models created in step c) to form a reference model list, and the list is sent to the terminal in step d).

In one particular embodiment of the present invention, the communication appliance is a terminal in a telecommunication network, and steps b) and d) are performed via connections in the telecommunication network.

Equally, a suitable way of achieving the above object in accordance with the present invention is with an apparatus for creating reference models for voice recognition systems of the type mentioned in the introduction having an interface which is connected to the conversion part and can be used to receive command words and to supply them to the conversion part, and which can be used to transmit reference models created by the conversion part.

One preferred embodiment of the apparatus has a vocabulary memory, connected upstream of the conversion parts, for buffer-storing the command words received. This simplifies the processing of the incoming command words; additions or corrections to existing vocabulary lists also can be processed.

For corresponding reasons, it is beneficial if the apparatus has a reference model memory, connected downstream of the conversion part, for buffer-storing the reference models created.

In one embodiment of the apparatus, its interface is part of a telecommunication network.

In addition, the object which is set above is achieved on the basis of a communication appliance of the type mentioned in the introduction by a communication appliance having an input for entering command words in text form, and having a transmission/reception device which is connected to the input and to the memory of the reference model list and can be used to set up communication links to a converter station which can be used to transmit command words and to receive reference models.

Additional features and advantages of the present invention are described in, and will be apparent from, the following Detailed Description of the Invention and the Figures.

DETAILED DESCRIPTION OF THE INVENTION

Figure 1:
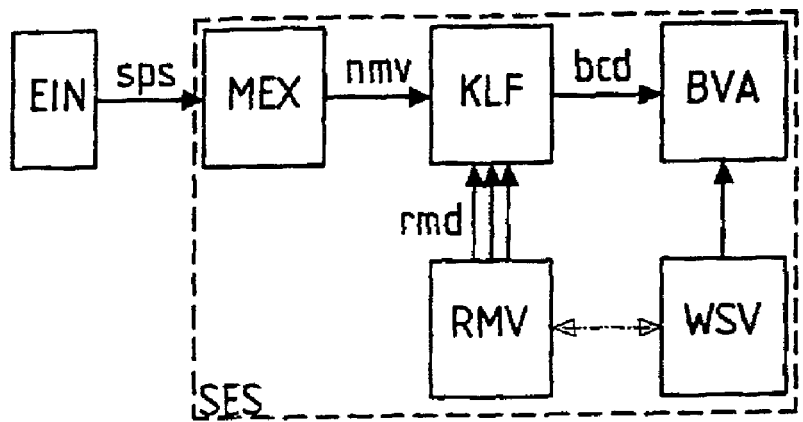
FIG. 1 shows a voice recognition system according to the prior art.

First of all, the fundamental components of a voice recognition system SES will be explained with reference to FIG. 1 to the extent necessary for better understanding of the present invention. The procedure of the voice recognition shown in FIG. 1 is well known to the person skilled in the art; more detailed information can be found, by way of example, in the article by Steve Young, "A Review of Large-Vocabulary Continuous-Speech Recognition", IEEE Signal Processing Magazine, Sept. 1996, pp. 45–57 which, beyond a basic illustration of the procedure of voice recognition, discusses continuous voice recognition, in particular, in more detail.

The purpose of the voice recognition system SES is to receive a command entered by the user audibly in the form of speech and to determine therefrom the command which is to be executed. The spoken command is converted into an electrical voice signal sps in analog or digitized form using an acoustic input EIN; e.g., a microphone. The voice signal is supplied to a feature-extracting preprocessing section MEX. The first step of the preprocessing section MEX is normally signal analysis of the voice signal sps, e.g. in the form of a Fourier transform, and subsequent resolution into frequency channels. From the signal parameters obtained in this manner, the features required for voice recognition are extracted; this step is simultaneously used for (generally considerable) data reduction. The extracted features provide, in total, one feature vector which represents the user's expression. Preferably, the feature vector is also subjected to normalization in order to compensate for the possible variations in speech; e.g., in terms of intonation, volume, speed, etc. The result of the preprocessing section MEX is a normalized feature vector nmv which is subjected to the subsequent classification section KLF as a test pattern.

The classification section KLF uses a list RMV of reference models to determine the correspondence, within the respectively prescribed discrepancy range, with the test pattern nmv provided. In this context, according to the given requirements, for example correspondence of the test pattern with a single reference model rmd (single word recognition), it is possible to ascertain the correspondence between one or more parts of the test pattern and a respective reference model rmd (keyword recognition) or the correspondence with a succession of reference models (sentence recognition). A reference model may, by way of example, be in the form of a reference vector in the style of a normalized feature vector or in the form of a "Hidden Markov Model" (HMM). Each reference model in the list RMV corresponds to a word ("command word") from a vocabulary stored in a vocabulary list WSV. The command words are defined in written form, for example. They also have associated semantic information which reveals the "meaning" of the command words; the nature and scope of the information depend on the command processing section arranged downstream, however.

The result of the classification section KLF is a command code bcd; e.g., in the form of one or more indices which respectively denote the recognized reference model or its associated command word. The command code bed is forwarded to a command processing section BVA which interprets the command code and, on the basis of the prescribed "meaning" of the command words and possibly using semantic information stored in the vocabulary WSV, performs the appropriate operations.

When voice recognition is used for a telecommunication terminal, as in the example under consideration in this case, the "meaning" of a command word may be a command, for example, such as a request to set up a telecommunication link, may represent a signal, such as a digit in a dialing operation, or may represent a combination of other words as an "abbreviation". By way of example, for a voice-controlled telephone, an expression like "set up a connection to Max Meier" could, with appropriate programming, be broken down into three command words; namely, "connection" as the instruction to initiate a telephone call, "Max Meier" as the programmed abbreviation for a call number, namely that of Mr. Max Meier, and "set up" as the stop sign, insofar as the end of the expression is not recognized anyway.

The example just given contains an abbreviation whose wording and meaning beneficially can be programmed by the user. This presupposes that the user is able to define the wording of a command and subsequently this wording is made available to the voice recognition system SES as a reference model. In this context, it is of lesser importance to the present invention whether, by way of example, a command which already exists is allocated a new wording (for the same meaning) instead of or in addition to the already existing wording(s), or whether a new command with a preset or programmable meaning is set up. In accordance with the present invention, the wording of a command word is defined in a speaker-independent form, namely in text form, e.g. in the form of a written word in the customary manner of writing, possibly with additional transcriptions, or phonetically.

Figure 2:
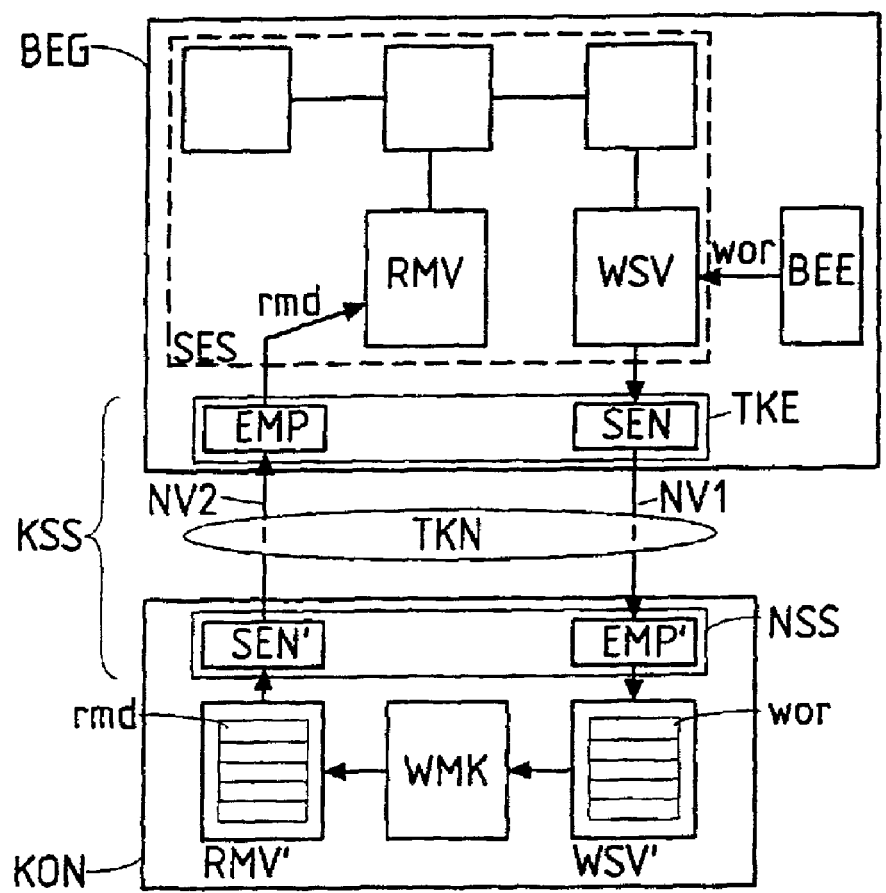
FIG. 2 shows the creation of reference models for the voice recognition system shown in FIG. 1.

With reference to FIG. 2, the commands desired by the user are entered into the terminal BEG in the form of text. This is done using a command word input unit BEE; e.g., a keyboard or a spelling recognition unit. The command words wor entered in this way are collected in a vocabulary list WSV in the terminal BEG. The command words wor are converted into reference models rmd, are stored in the reference model list RMV in the terminal BEG and in this way are made available to the voice recognition system SES.

The word/model conversion WMK of the command words entered in text form to produce reference models corresponding thereto is performed on the basis of a known method of grapheme-to-phoneme conversion; cf. the aforementioned article in IEEE Signal Processing Magazine, for example, in this regard. The conversion also takes account of context-dependent changes to the phonemes, such as occur during speech, for example by taking "diphones and triphones", which arise from the combination of two or three successive phonemes, respectively, as a basis for creating the reference models.

In accordance with the present invention, the word/model conversion WMK is not performed in the terminal BEG, but rather in a remote converter station KON. This has the advantage that the generally considerable computation power required for the conversion does not need to be provided by the terminal BEG. The command words wor or the vocabulary list WSV are sent to the converter station via a converter interface KSS; this or another converter interface KSS is used to return the reference models rmd created during conversion or a list RMV compiled from the reference models to the terminal BEG. In particular, the converter station may be a central computing station which can be used by a number of users, e.g. a base station in a telecommunication network or a server in a computer network. In this way, system resources can be used economically. In addition, any further developments of the conversion methods immediately can be made available to the various users or their terminals.

In the exemplary embodiment under consideration in this case, the converter station KON is a central service computer which the operator of the telecommunication network TKN to which the terminal BEG is connected or subscribed has set up to perform word/model conversions. In this case, the telecommunication terminal device TKE of the terminal BEG can be used to produce the converter interface KSS. It proves to be advantageous that the terminal BEG has the necessary parts for information exchange via a network connection NV1, NV2 anyway, so that the terminal BEG does not additionally need to provide an appropriate transmission/reception device for transmitting the command words and for receiving the reference models. The converter station KON provides the converter interface KON in a known manner by virtue of the link to the telecommunication network TKN via a network-internal interface NSS.

In one variant, the interface elements of the communication appliance BEG and of the converter station KON also can be provided separately for transmitting the command words wor, on the one hand, and for sending the reference models rmd on the other. In this case, the communication appliance BEG provides a transmission interface SEN for sending the command words wor and a reception interface EMP for receiving the reference models rmd; these together form a transmission/reception interface TKE as that part of the converter interface KSS which belongs to the communication appliance. Accordingly, for its part NSS of the converter interface, the converter station KON provides a reception interface EMP' and a transmission interface SEN' for receiving the command words wor and for sending the created reference models rmd.

When the command words have been entered by the user, who needs to have subscribed for the use of the word/model conversion service provided by the service computer, the command words are transmitted to the converter station KON via a connection NV1 in the telecommunication network. The converter station KON uses the command words wor obtained in this manner to create reference models rmd, and then returns these to the terminal BEG. The reference models rmd are sent via a network connection NV2 which is beneficially initiated independently of the first connection NV1. In this context, it is possible for setup of the connection NV2 to be initiated by the terminal at a later time; for example, using an initiating request for the result of the word/model conversion to the converter station KON. Beneficially, the connection NV2 is initiated from the converter station KON; for example, as soon as conversion is complete or if the reference models rmd or the reference model list RMV for the user has been redefined on the basis of an update of the conversion methods.

The command words wor can be transmitted and the reference models rmd can be returned using a short message service, for example, such as the SMS ("Short Message Service") in the GSM network. Similarly, the command words and reference models can be exchanged in the form of an attachment to an e-mail message. The form of the message(s) naturally depends on the terminal used and on the telecommunication network in the individual case.

Instead of the newly configured command words, the terminal can also transmit the full vocabulary WSV or a particular part thereof, including the new command words, to the converter station KON as vocabulary WSV' to be processed. The conversion result returned by the converter station KON is a reference model list RMV' which appropriately complements or entirely or partially replaces the list RMV in the terminal BEG. This procedure allows the word/model conversion WMK also to include the command words which already exist, which is why it is possible to achieve comparatively better word recognition as compared with demarcating the individual command words or the associated reference models with respect to one another.

The command words entered by the user may, by way of example, be names of potential parties to a call which are linked to the respectively associated call number. The present invention thus allows a "voice-controlled telephone directory" which can be retrieved independently of speaker, e.g. in the case of a company's dedicated in-house telephone system, in which voice recognition is carried out centrally by the in-house system, by all users of the in-house system.

In one possible variant, the converter station KON can, by way of example, be a computer of sufficient computation power which exchanges the command words and the reference models created for them with the communication appliance BEG via a line-connected or wireless interface; e.g., an infra-red interface.

Although the present invention has been described with reference to specific embodiments, those of skill in the art will recognize that changes may be made thereto without departing from the spirit and scope of the invention as set forth in the hereafter appended claims.

The invention claimed is:

1. A method for creating a reference model list for a speaker-independent voice recognition system in a voice-controlled communication appliance, the method comprising the steps of:
   generating at least one command word in text form on the communication appliance;
   transmitting the at least one command word to a converter station via a communication link initiated by the communication appliance;
   creating at least one reference model by the converter station using the at least one command word, with a respective command word having a reference model allocated to it via word/model conversion;
   sending the at least one reference model to the terminal via a further communication link; and
   storing the at least one reference model received in a reference model list by the communication appliance, wherein the reference model list is accessed by the speaker-independent voice recognition system during operation on the voice-controlled communication appliance.

2. A method for creating a reference model list for a speaker-independent voice recognition system in a voice-controlled communication appliance as claimed in claim 1, wherein the step of entering the at least one command word includes collecting the at least one command word in a command list by the communication appliance, and the step of transmitting the command word includes transmitting the command list to the converter station based on a specific command given to the communication appliance by the user.

3. A method for creating a reference model list for a speaker-independent voice recognition system in a voice-controlled communication appliance as claimed in claim 1, the method further comprising the steps of:
   compiling the at least one reference model created to form a reference model list; and
   sending the list to the terminal in the step of sending the at least one reference model.

4. A method for creating a reference model list for a speaker-independent voice recognition system in a voice-controlled communication appliance as claimed in claim 1, wherein the communication appliance is a terminal in a telecommunication network, and the steps of transmitting and sending are performed via connections in the telecommunication network.

5. An apparatus for creating reference models for speaker-independent voice recognition systems, comprising:
   a conversion part for performing word/model conversion on command words in text form to produce reference models; and
   an interface connected to the conversion part that receives command words and passes the command words to the conversion part, wherein the interface transmits reference models created by the conversion part, and wherein the reference models are accessed by speaker-independent voice recognition systems during operation on a voice-controlled communication appliance.

6. An apparatus for creating reference models for speaker-independent voice recognition systems as claimed in claim 5, further comprising:
   a vocabulary memory connected upstream of the conversion part for buffer-storing the command words received.

7. An apparatus for creating reference models for speaker-independent voice recognition systems as claimed in claim 5, further comprising:
   a reference model memory connected downstream of the conversion part for buffer-storing the reference models created.

8. An apparatus for creating reference models for speaker-independent voice recognition systems as claimed in claim 5, wherein the interface is part of a telecommunication network.

9. A voice-controlled communication appliance, comprising:
   a speaker-independent voice recognition system having a memory for a reference model list;
   an input for entering command words in text form; and
   a transmission/reception device connected both to the input and to the memory of the reference model list, wherein the transmission/reception device sets up communication links to a converter station which transmits command words and receives reference models that are accessed by the speaker-independent voice recognition system during operation on the voice-controlled communication appliance.

10. A voice-controlled communication appliance as claimed in claim 9, further comprising:
   a command list, connected between the input and the memory of the reference model list, for storing the command words.

11. A voice-controlled communication appliance as claimed in claim 9, wherein the transmission/reception device is a terminal device in a telecommunication network.

12. A method for creating a reference model list in a voice-controlled communication appliance, the method comprising the steps of:
   entering at least one speaker-independent command word in text form on the communication appliance by a user;
   transmitting the at least one command word to a converter station via a communication link initiated by the communication appliance;
   receiving at least one reference model transmitted from the converter station using the at least one command word, with a respective command word having a reference model allocated to it via word/model conversion, wherein the at least one reference model is received via a further communication link; and
   storing the at least one reference model received in a reference model list by the communication appliance, wherein the reference model list is accessed by the speaker-independent voice recognition system during operation on the voice-controlled communication appliance.

* * * * *